US011014508B2

(12) United States Patent
Endo et al.

(10) Patent No.: US 11,014,508 B2
(45) Date of Patent: May 25, 2021

(54) COMMUNICATION SUPPORT SYSTEM, COMMUNICATION SUPPORT METHOD, AND STORAGE MEDIUM

(71) Applicant: HONDA MOTOR CO., LTD., Tokyo (JP)

(72) Inventors: Wataru Endo, Wako (JP); Atsushi Sekiguchi, Wako (JP); Hiroshi Sugihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/589,174

(22) Filed: Oct. 1, 2019

(65) Prior Publication Data

US 2020/0114834 A1    Apr. 16, 2020

(30) Foreign Application Priority Data

Oct. 10, 2018  (JP) .............................. JP2018-192071

(51) Int. Cl.
*B60R 11/02*  (2006.01)
*G10L 15/08*  (2006.01)

(52) U.S. Cl.
CPC ...... *B60R 11/0247* (2013.01); *B60R 11/0217* (2013.01); *G10L 15/08* (2013.01); *G10L 2015/088* (2013.01)

(58) Field of Classification Search
CPC . B60R 11/0247; B60R 11/0217; G10L 15/08; G10L 2015/088; G10L 15/26; G10L 15/20
USPC .......................................................... 381/86
See application file for complete search history.

(56) References Cited

U.S. PATENT DOCUMENTS

| 9,961,435 | B1* | 5/2018 | Goyal | G10L 25/84 |
| 10,140,089 | B1* | 11/2018 | Paranjpe | H04M 9/082 |
| 2019/0311715 | A1* | 10/2019 | Pfeffinger | G10L 15/22 |

FOREIGN PATENT DOCUMENTS

JP     2018-076035    5/2018

* cited by examiner

*Primary Examiner* — Vivian C Chin
*Assistant Examiner* — Douglas J Suthers
(74) *Attorney, Agent, or Firm* — Amin, Turocy & Watson, LLP (57) ABSTRACT

Provided is a communication support system including: a microphone that is mounted in an interior of a vehicle; a sound output device that is mounted in the interior of vehicle; a recognizer configured to recognize spoken content included in sound data collected by the microphone; and a controller configured to generate a delivery message to be delivered from a passenger who has output the collected sound to another passenger on the basis of a result of the recognition performed by the recognizer, generates sound based on the generated delivery message, and causes the sound output device to output the generated sound toward the other passenger.

12 Claims, 9 Drawing Sheets

| USER ID | CALLED NAME | ATTRIBUTE | SET SEAT | FACE INFORMATION |
|---------|-------------|-----------|----------|------------------|
| 001 | DAD | MALE, 30S | DRIVER'S SEAT ST1 | ... |
| 002 | MOM | FEMALE, 30S | FRONT PASSENGER SEAT ST2 | ... |
| 003 | TARO, TA-CHAN | MALE, TODDLER | REAR SEAT ST4 | ... |
| 004 | HANA-CHAN | FEMALE, INFANT | REAR SEAT ST3 | ... |
| ... | ... | ... | ... | ... |

| SEAT ID | USER ID | WAKEUP WORD |
|---------|---------|-------------|
| ST1 | 001 | DAD |
| ST2 | 002 | MOM |
| ST4 | 003 | TARO, TA-CHAN |
| ST3 | 004 | HANA-CHAN |
| ... | ... | ... |

COMMUNICATION SUPPORT SYSTEM, COMMUNICATION SUPPORT METHOD, AND STORAGE MEDIUM

CROSS-REFERENCE TO RELATED APPLICATION

Priority is claimed on Japanese Patent Application No. 2018-192071, filed Oct. 10, 2018, the content of which is incorporated herein by reference.

BACKGROUND

Field of the Invention

The present invention relates to a communication support system, a communication support method, and a storage medium.

Description of Related Art

In the related art, a device that supports communication in an interior of a vehicle by displaying a video of a speaking person on a monitor for persons other than the speaking person and outputting sound of the speaking person from speakers for the persons other than the speaking person is known (see Japanese Unexamined Patent Application, First Publication No. 2018-076035).

SUMMARY

However, according to the related art, it may be difficult to deliver spoken content to a counterpart in a case in which the counterpart of the speaking is not actively trying to communicate, for example, in a situation in which a child seated in a rear seat is playing and a parent seated in a driver's seat is giving a warning.

An aspect of the invention was made in consideration of such circumstances, and one of objectives thereof is to provide a communication support system, a communication support method, and a storage medium that enable effective support of communication in an interior of a vehicle.

The communication support system, the communication support method, and the storage medium according to the invention employ the following configurations.

(1): According to an aspect of the invention, there is provided a communication support system including: a microphone that is mounted in an interior of a vehicle; a sound output device that is mounted in the interior of the vehicle; a recognizer configured to recognize spoken content included in sound data collected by the microphone; and a controller configured to generate a delivery message to be delivered from a passenger who has output the collected sound to another passenger on the basis of a result of the recognition performed by the recognizer, generates sound based on the generated delivery message, and causes the sound output device to output the generated sound to the other passenger.

(2): According to the above aspect (1), the controller is configured to generate sound that imitates speaking of a person who is different from the passenger who has output the collected sound.

(3): According to the above aspect (1), the controller is configured to decide a predetermined position in the interior of the vehicle on the basis of a relationship between a seat position of the passenger and a seat position of the other passenger and configured to cause the sound output device to localize a simulated sound source of the generated sound at the predetermined position.

(4): According to the above aspect (1), the sound output device includes a plurality of sound output devices that are mounted at different positions in the interior of the vehicle, and the controller is configured to provide an instruction for outputting sound to a sound output device located close to the other passenger among the plurality of sound output devices.

(5): According to the above aspect (1), the controller is configured to provide to the sound output device provided with directivity an instruction for outputting sound in a direction from the passenger toward the other passenger.

(6): According to the above aspect (1), the controller is configured to refer to a wakeup word associated in advance with each of the passengers on the basis of the result of the recognition performed by the recognizer, and in a case in which the wakeup word is included in the spoken content, the controller is configured to cause sound generated on the basis of the collected sound to be output toward the passenger associated with the wakeup word.

(7): According to the above aspect (1), the controller is configured to determine whether or not the other passenger has responded to the speaking of the passenger who has output the collected sound on the basis of the result of the recognition performed by the recognizer, and in a case in which the other passenger has not responded to the speaking of the passenger who has output the collected sound, the controller is configured to cause the sound generated on the basis of the collected sound to be output toward the other passenger.

(8): According to the above aspect (1), the communication support system further includes: a camera configured to image the interior of the vehicle; and an image analyzer configured to analyze an image captured by the camera, and the controller configured to determine whether or not the other passenger is sleeping on the basis of a result of the image analysis performed by the image analyzer, and in a case in which the other passenger is not sleeping, the controller causes the sound generated on the basis of the collected sound to be output toward the other passenger.

(9): According to the above aspect (1), the controller estimates an emotion of the speaking person and generates the delivery message in accordance with the estimated emotion on the basis of the result of the recognition performed by the recognizer.

(10): According to the above aspect (9), the controller is configured to generate the delivery message changed to an expression with a suppressed emotion as compared with the spoken content in a case in which a level of the estimated emotion is equal to or greater than a predetermined value.

(11): According to an aspect of the invention, there is provided a communication support system including: a microphone that is mounted in an interior of a vehicle; a recognizer configured to recognize spoken content included in sound data collected by the microphone; and a controller configured to refer to a wakeup word associated in advance with each of passengers in the interior of the vehicle on the basis of a result of the recognition performed by the recognizer, and in a case in which the wakeup word is included in the spoken content, starts communication support.

(12): According to an aspect of the invention, there is provided a communication support method including, by a computer: recognizing spoken content included in sound data collected by a microphone that is mounted in an interior of a vehicle; and generating a delivery message to be delivered from a passenger who has output the collected sound to another passenger on the basis of a result of the recognition, generating sound based on the generated delivery message, and causing a sound output device mounted in the interior of the vehicle to output the generated sound toward the other passenger.

(13): According to an aspect of the invention, there is provided a computer-readable non-transitory storage medium that stores a program that causes a computer to: recognize spoken content included in sound data collected by a microphone that is mounted in an interior of a vehicle; and generate a delivery message to be delivered from a passenger who has output the collected sound to another passenger on the basis of a result of the recognition, generate sound based on the generated delivery message, and cause a sound output device mounted in the interior of the vehicle to output the generated sound toward the other passenger.

According to the above aspects (1) to (13), it is possible to effectively support communication in an interior of a vehicle.

DESCRIPTION OF EMBODIMENTS

Hereinafter, an embodiment of a communication support system, a communication support method, and a storage medium according to the invention will be described with reference to the drawings. Hereinafter, an agent device that is mounted in a vehicle and is provided with an agent function is employed as an example of the communication support system. The agent device is an example of the communication support system. The agent device performs various kinds of information processing and control of devices in the interior of the vehicle for the purpose of assisting with delivery of conversation between passengers in the vehicle, for example. The various kinds of processing and the control for the purpose of supporting delivery of conversation between the passengers in the vehicle are executed, for example, to assist with effective delivery of content spoken by a speaking person to a speaking counterpart and are executed, for example, in a case in which a predetermined condition is satisfied.

The agent device may cause the display to display an image such as a personified animal or character (hereinafter referred to as an agent image) in order to visualize a virtual conversation partner for a passenger. The agent image includes, for example, a face image to such an extent that at least a facial expression and a face direction are recognized by an observer. For example, an agent image represents parts that simulate eyes and a nose in a face region, and a face direction is recognized on the basis of positions of the parts in the face region. Also, an agent image may be recognized in a three-dimensional manner and include a head image in a three-dimensional space such that an observer recognizes a face direction.

The communication support system is realized by comprehensively using a natural language function (processing for understanding text structures and meanings), conversation control processing, retrieval processing, and the like in addition to sound recognition processing for recognizing sound of a passenger (processing for converting sound into text), for example A part or all of the processing is realized by artificial intelligence (AI) technologies. Some or all configurations that perform the processing may be provided in a server device or the like that can communicate with the vehicle or may be provided on the vehicle side.

Although a right-hand drive vehicle will be described below as an example, the right may be read as the left instead in a case in which a left-hand drive vehicle is applied. Although an example in which a seat configuration in the interior of the vehicle includes two front and rear seat rows will be described below, the vehicle may include three or more seat rows. In this case, the second row and the third row may be in a relationship in which the second row corresponds to the front row and the third row corresponds to the rear row, or the first row and the third row may be in a relationship in which the first row corresponds to the front row and the third row corresponds to the rear row. Hereinafter, a passenger who is seated in a driver's seat or a front passenger seat (a seat next to the driver's seat) will be referred to as a front passenger, and a passenger who is seated in a seat on the further rear side than the front passenger will be referred to as a rear passenger.

[Overall Configuration]

Figure 1:
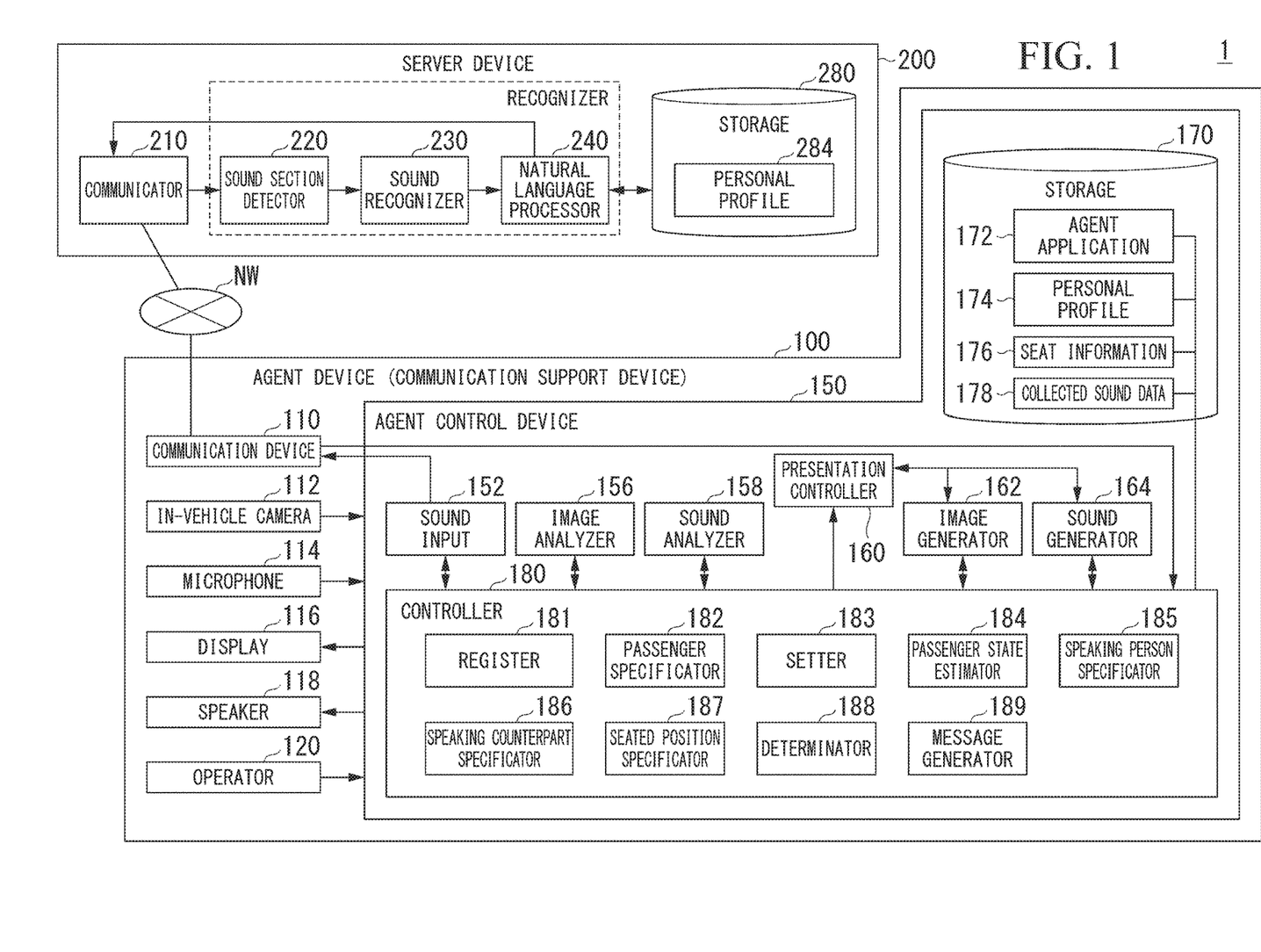
FIG. 1 is a configuration diagram of a communication support system that includes an agent device according to an embodiment.

FIG. 1 is a configuration diagram of a communication support system 1 that includes the agent device according to the embodiment. The communication support system 1 includes an agent device (communication support system) 100 and a server device 200. The agent device 100 and the server device 200 are connected to each other in a state in which data can be transmitted and received via a network NW such as the Internet, a wide area network (WAN), or a local area network (LAN), for example. Although the server device 200 can communicate with a plurality of agent devices 100, the server device 200 is assumed to communicate with a single agent device 100 for convenience of the description below.

The agent device 100 includes, for example, a communication device 110, an in-vehicle camera 112, a microphone 114, a display 116, a speaker 118, an operator 120, and an agent control device 150. These devices and machines are connected to each other via a multiplexed communication line such as a controller area network (CAN) communication line, a serial communication line, a wireless communication network, or the like. The configuration illustrated in FIG. 1 is only an example, and parts of the configuration may be omitted or others configuration may be further added thereto.

The communication device 110 communicates with other vehicles and the server device 200 via the network NW using, for example, a cellular network, a Wi-Fi network, Bluetooth (registered trademark, not repeated below), dedicated short range communication (DSRC), or the like.

The in-vehicle camera 112 captures, for example, an image including faces of the respective passengers who are seated in the seats mounted in the interior of the vehicle M. The in-vehicle camera 112 is a digital camera using a solid imaging element such as a charge coupled device (CCD) or a complementary metal oxide semiconductor (CMOS), for example. The in-vehicle camera 112 images each passenger at a predetermined timing, for example. The image captured by the in-vehicle camera 112 is output to the agent control device 150.

The microphone 114 is a sound input device that collects sound in the interior of the vehicle. For example, the microphone 114 is mounted near a front side of passengers seated in the seats in the interior of the vehicle. For example, the microphone 114 is mounted near a map lamp, a steering wheel, an instrument panel, or a seat. A plurality of microphones 114 may be set in the vehicle.

The display 116 is mounted near the front side of the passengers seated in the seats in the interior of the vehicle, for example. The speaker 118 is mounted, for example, near the seats in the interior of the vehicle or near the display 116. A plurality of displays 116 and a plurality of speakers 118 may be mounted in the interior of the vehicle.

Figure 2:
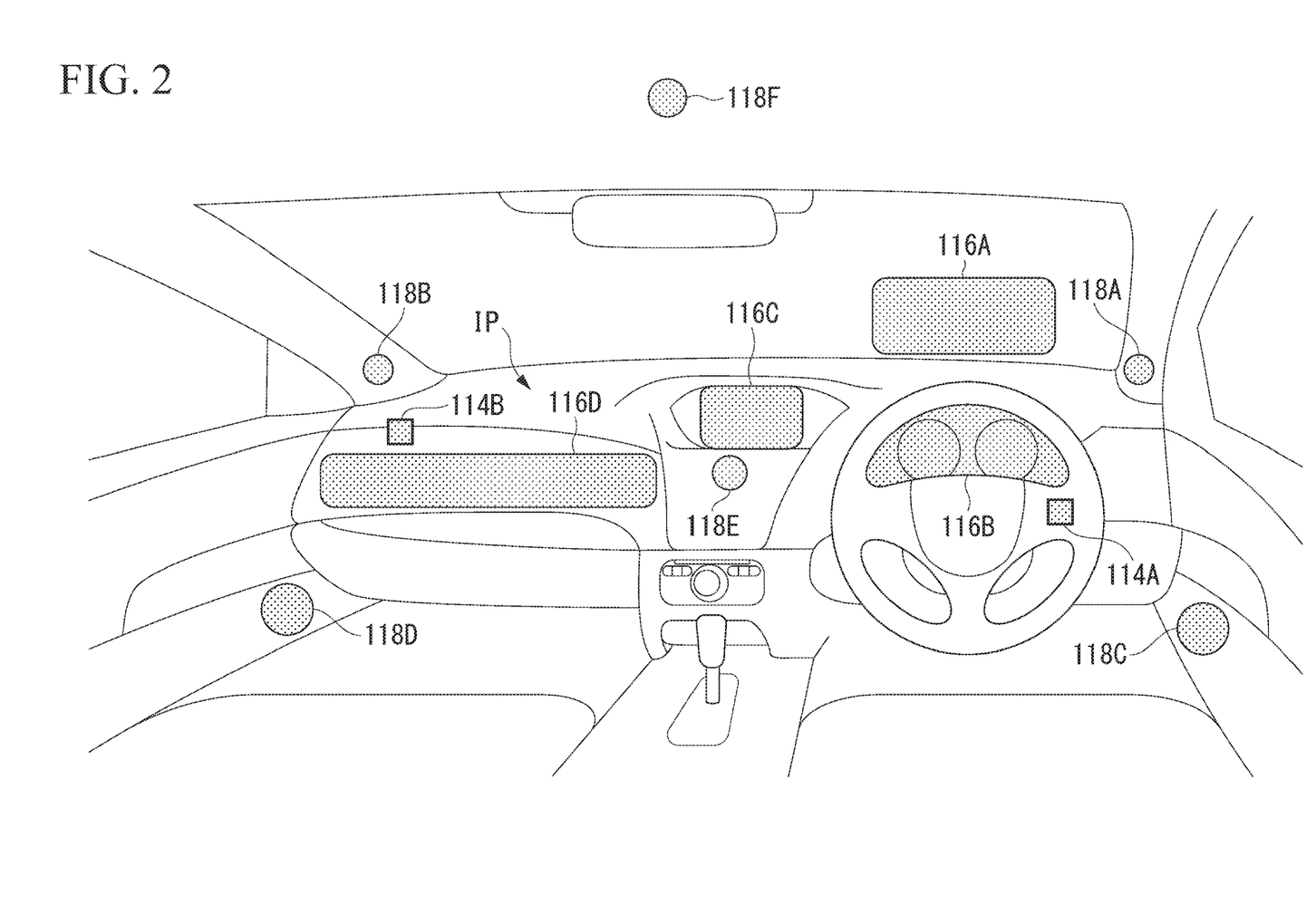
FIG. 2 is a diagram schematically illustrating a microphone, a display, and a speaker that are mounted in a vehicle.

FIG. 2 is a diagram schematically illustrating microphones, displays, and speakers mounted in a vehicle. In the interior of the vehicle in FIG. 2, microphones 114A and 114B, displays 116A to 116D, and speakers 118A to 118F are mounted. The microphone 114A is a microphone that mainly collects speaking of a driver and is provided at a steering wheel, for example. The microphone 114B is a microphone that mainly collects speaking of a passenger at the front passenger seat and is provided near the front of the front passenger seat on the instrument panel IP.

The display 116A is mounted at the end of a line of sight when the driver looks outside of the vehicle, for example. The display 116A is a head-up display (HUD) device, for example. The HUD device is a device that shows a driver an image in a superimposed manner on a landscape, and in one example, the HUD device is a device for showing a passenger a virtual image by projecting light including the image to a front wind shield or a combiner of the vehicle. The passenger is mainly a driver but may be a passenger other than the driver.

The display 116B is provided near the front of the driver's seat (the seat that is closest to the steering wheel, for example) on the instrument panel IP and is mounted at a position at which the passenger can see the display 116B from a gap of the steering wheel or over the steering wheel. The display 116B is a liquid crystal display (LCD) or an organic electroluminescence display device, for example. For example, images of a speed of the vehicle M, an engine rotation frequency, a remaining fuel amount, a radiator water temperature, a traveling distance, and other information are displayed on the display 116B.

The display 116C is mounted near the center of the instrument panel IP. The display 116C is an LCD, an organic EL display device, or the like similarly to the display 116B, for example. The display 116C may display television programs, replay DVDs, and display downloaded content such as movies.

The display 116D is provided near the front of the front passenger seat on the instrument panel IP. The display 116D displays television programs, replays DVDs, and displays downloaded content such as movies. In the interior of the vehicle, a display adapted such that information that can be seen by the passenger through side mirrors of the vehicle M is captured by a camera outside the vehicle and the display displays the acquired information may be mounted.

The speakers 118A and 118B are mounted at left and right front window pillars (so-called A pillars) of the vehicle M, for example. The speaker 118C is mounted below a door on the driver's seat side, and the speaker 118D is mounted below a door on the front passenger seat side. The speaker 118E is mounted near the display 116C, that is, near the center of the instrument panel IP. The speaker 118F is mounted near the center of a ceiling of the interior of the vehicle.

Figure 3:
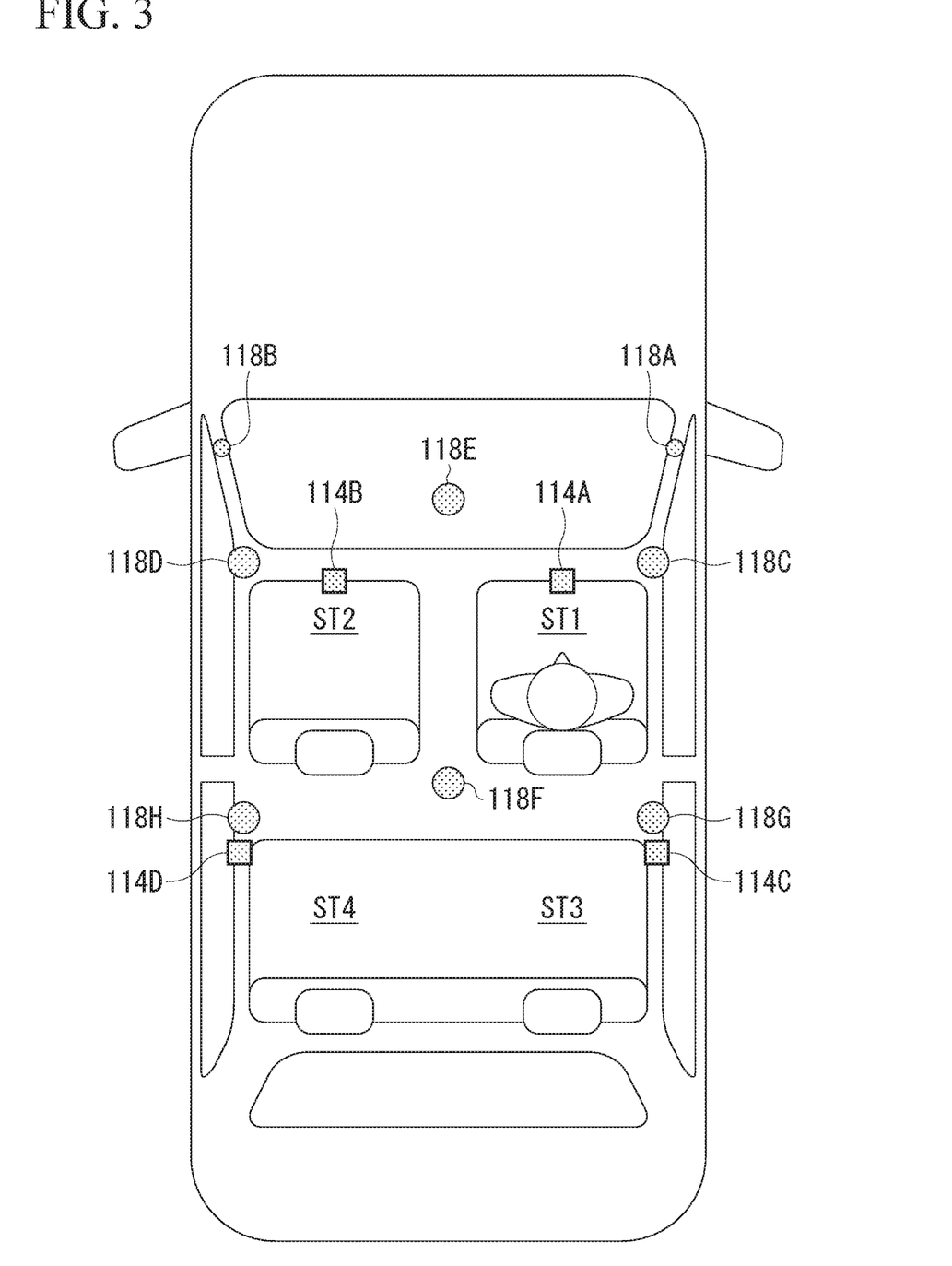
FIG. 3 is a diagram for explaining a position of a speaker near a rear seat.

In the vehicle, a microphone and a speaker may be provided near the rear seat. FIG. 3 is a diagram for explaining positions of the speakers near the rear seat. In the example in FIG. 3, a microphone 114C and a speaker 118G are provided near a rear seat ST3 mounted behind a driver's seat ST1 in addition to the microphones and the speakers illustrated in FIG. 2. A microphone 114D and a speaker 118H are provided near a rear seat ST4 mounted behind a front passenger seat ST2. For example, the microphones 114C and 114D and the speakers 118G and 118H are provided below doors in the left-right direction. The speakers 118 may be provided at window pillars (so-called B pillars) provided between the front doors and the rear doors of the vehicle M or may be provided in the direction of the rear seat. ST1 to ST4 are seat IDs that are identification information for identifying the respective seats, for example.

The operator 120 receives manual operations from passengers. The operator 120 includes, for example, a switch, a button, a key, and the like. The operator 120 is provided at a steering wheel or in the instrument panel, for example. The operator 120 may be configured integrally with the display 116 as a touch panel.

[Agent Control Device]

The agent control device 150 generates sound of a delivery message on the basis of sound collected in the interior of the vehicle and causes the generated sound to be output to the interior of the vehicle. The invention is not limited thereto, and the agent control device 150 may transmit sound collected in the interior of the vehicle to the server device 200 and cause the server device 200 to output the generated delivery message to the interior of the vehicle. The delivery message is a message to be delivered from a passenger who is a speaking person to another passenger who is a counterpart of the speaking. The delivery message includes content spoken by a third person (agent) who is different from the speaking person, for example. The delivery message may be a message that is the same as the content spoken by the passenger who is the speaking person or may be a message generated on the basis of the spoken content.

The agent control device 150 includes, for example, a sound input 152, an image analyzer 156, a sound analyzer 158, a presentation controller 160, an image generator 162, a sound generator 164, a storage 170, and a controller 180. These components are realized by a computer processor such as a central processor (CPU) executing programs (software). Some or all of these components may be realized by hardware (circuit unit; including a circuitry) such as large scale integration (LSI), an application specific integrated circuit (ASIC), a field-programmable gate array (FPGA), or a graphics processor (GPU) or may be realized by software and hardware in cooperation. The programs may be stored in advance in the storage 170, or the programs may be stored in a detachable storage medium such as a DVD or a CD-ROM and installed in the storage 170 by the storage medium being attached to a drive device.

The sound input 152 receives sound inputs from microphone 114. The sound input 152 may transmit the received sound (a sound stream; the same applies below) to the server device 200 via the communication device 110. The sound input 152 may store the received sound as a part of collected sound data 178 in the storage 170.

The image analyzer 156 performs analysis processing on an image captured by the in-vehicle camera 112 and extracts feature information such as a human shape, a face shape, and the like. The image analyzer 156 extracts feature information for each seat and associates each seat ID with the result of extraction, for example. The image analyzer 156 may acquire information regarding positions of passengers seated in the seats in the interior of the vehicle, behaviors of the passengers, and lines of sight by extracting the feature information. The behaviors of the passengers include, for example, directions of passengers' faces and body postures.

The sound analyzer 158 performs analysis processing on the sound collected by the microphone 114 and acquires information indicating characteristics of voice. The information indicating characteristics of voice includes information indicating a voice tone (an index indicating the pitch of the voice), a volume of the voice, and the like, information indicating a change in frequency, and the like.

The presentation controller 160 causes the display 116 to display an image generated by the image generator 162 in response to an instruction from the controller 180. The presentation controller 160 causes the speaker 118 to output sound generated by the sound generator 164 in response to an instruction from the controller 180.

The image generator 162 generates an agent image and an avatar image and outputs the images to the display 116, for example. The avatar image is an image like an agent image expressed with a face imitating each user's face, is set in advance for each user, and is stored in the storage 170. The image generator 162 may generate an image with an agent or an avatar with a changed facial expression on the basis of a state of the speaking person or content of the delivery message. In a case in which the speaking person is angry, for example, the image generator 162 may generate an avatar image with an angry facial expression or may generate an agent image with a troubled facial expression.

The sound generator 164 generates sound to virtually position a simulated sound source (virtually placement of sound source) at a localized position using one or more speakers 118 on the basis of a localization position (which will be described later) decided by the controller 180. Localization of a simulated sound source means for example, setting a spatial position of a sound source that a passenger perceives by adjusting a volume of sound output from the speakers 118 and delivered to right and left ears of the passenger. The simulated sound source is set on the basis of, for example, original sound properties of the sound source, information regarding an environment in the interior of the vehicle, and a head-related transfer function (HRTF). The sound generator 164 can locate the simulated sound source at a predetermined position using such a principle.

Figure 4:
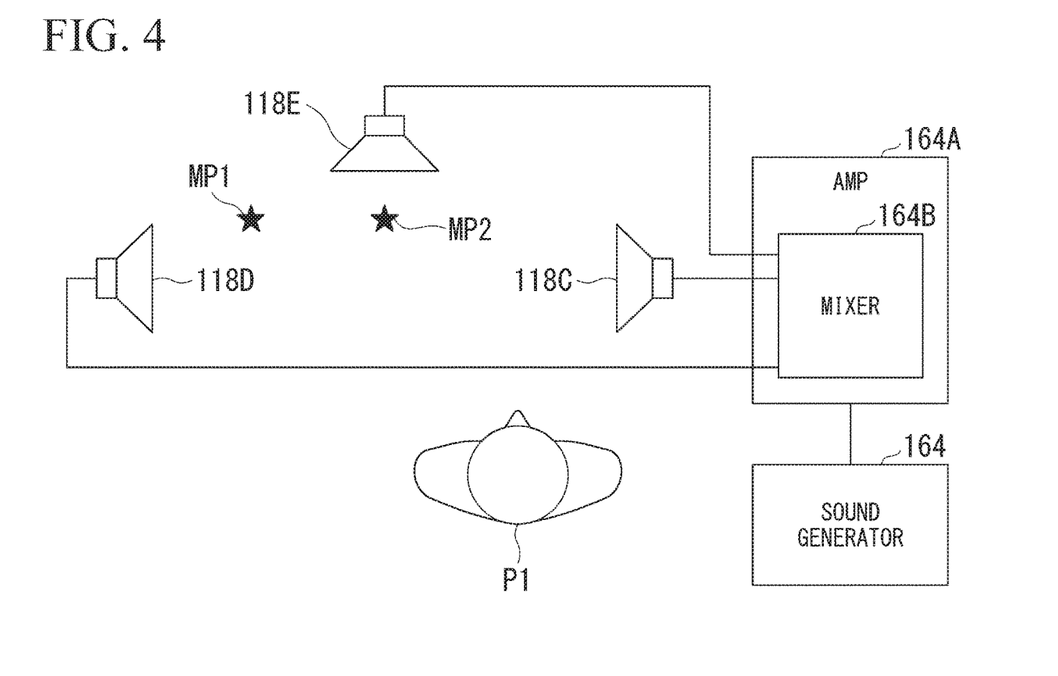
FIG. 4 is a diagram for explaining a state in which a simulated sound source localization position is moved.

FIG. 4 is a diagram for explaining a state in which a simulated sound source localization position is moved. FIG. 4 illustrates an example in which the simulated sound source is localized using the aforementioned speakers 118C to 118E for simplifying the explanation. In the example in FIG. 4, an AMP 164A and a mixer 164B are provided between the sound generator 164 and the speakers 118C to 118E. The AMP 164A adjusts a volume of sound output from each of the speakers 118C to 118E through control performed by the sound generator 164. For example, the AMP 164A can adjust sound within a range of 0 to 100% with respect to a reference sound volume (maximum intensity). The mixer 164B is provided with a function of generating a plurality of kinds of input sound. The mixer 164B is provided with a function of assigning sound to be output to each of the speakers 118C to 118E.

In a case in which a simulated sound source is localized at a special position MP1 illustrated in FIG. 4, for example, and in a case in which the AMP 164A performs a 5% output of predetermined sound to be output with respect to the maximum intensity from the speaker 118C, performs an 80% output with respect to the maximum intensity from the speaker 118D, and performs a 15% output with respect to the maximum intensity from the speaker 118E on the basis of sound generated by the sound generator 164, a passenger P1 perceives a simulated sound source as being localized at the special position MP1 illustrated in FIG. 4 from his/her position.

In a case in which the AMP 164A performs a 45% output of sound to be output with respect to the maximum intensity from the speaker 118C, performs a 45% output with respect to the maximum intensity from the speaker 118D, and performs a 10% output with respect to the maximum intensity from the speaker 118E, the passenger P1 can perceive a simulated sound source as being localized at the spatial position MP2 illustrated in FIG. 4 from his/her position. In this manner, it is possible to change a position at which a simulated sound source is localized by adjusting a volume of sound output from each of one or more selected speakers from among a plurality of speakers that are provided in the interior of the vehicle in a three-dimensional manner.

The storage 170 is realized, for example, by an HDD, a flash memory, an electrically erasable programmable read only memory (EEPROM), a read only memory (ROM), a random access memory (RAM), or the like. The storage 170 stores, for example, an agent application (program) 172, a personal profile 174, seat information 176, collected sound data 178, and the like. The agent application 172 may be downloaded from another device via the network NW, for example, or may be pre-installed in advance in the agent device 100.

The controller 180 controls execution and stop for the respective functional units in the agent control device 150. The controller 180 receives requests from the respective functional units through an application programming interface (API), selects a functional unit to execute processing based on the received request, and causes the selected functional unit to execute the processing via the API, for example.

The controller 180 includes, for example, a register 181, a passenger specificator 182, a setter 183, a passenger state estimator 184, a speaking person specificator 185, a speaking counterpart specificator 186, a seated position specificator 187, a determinator 188, and a message generator 189. These configurations are realized by a processor such as a central processor (CPU) executing the agent application 172 stored in the storage 170, for example.

The register 181 associates personal information input using the operator 120 with a user ID that is identification information for identifying each user and stores the personal information with the user ID in the personal profile 174 in the storage 170. The personal information includes, for example, a name and attributes (a sex and an age) of each user, information regarding seats, and the like. The register 181 associates information indicating feature amounts of a face extracted by the image analyzer 156 on the basis of an image captured by the in-vehicle camera 112 with the user ID and stores the information and the user ID in the personal profile 174 in the storage 170.

Figure 5:
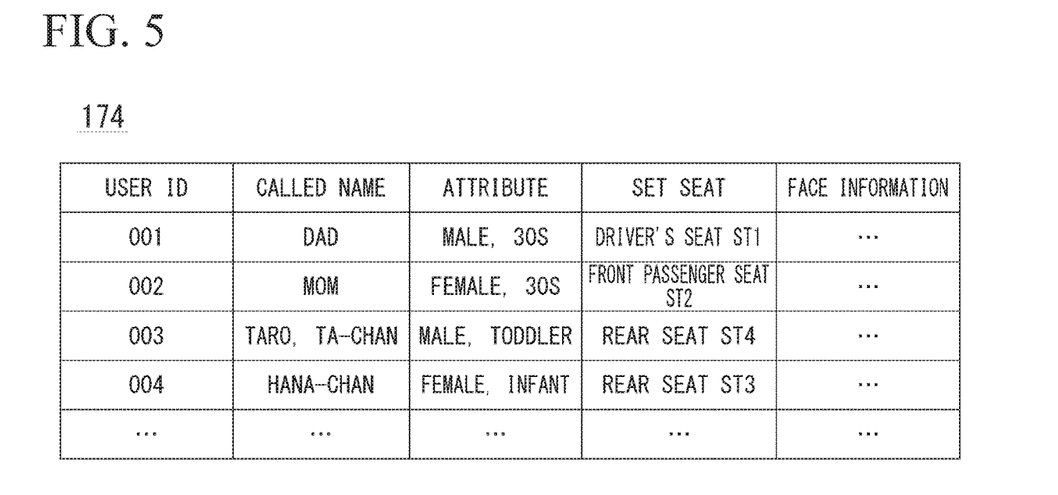
FIG. 5 is a diagram illustrating an example of content in a personal profile.

FIG. 5 is a diagram illustrating an example of content in the personal profile 174. The personal profile 174 includes, for example, a user ID, a name, attributes, a set seat, face information, and the like. The user ID is identification information for identifying each user. The name includes a part of a name, a name used by family members, a nickname, and the like. The set seat may be a seat that is set in advance as a seat in which each user is often seated and may be a seat set as a seat in which each user is often seated depending on a time zone and a day. The set seat may be set by a user using the operator 120 or may be set by the register 181 extracting a seat in which each user is often seated on the basis of past history information. The face information includes information indicating feature amounts of each user's face and the like.

The passenger specificator 182 specifies a passenger seated in each seat in the interior of the vehicle using face authentication technologies. For example, the passenger specificator 182 matches a result of analysis performed by the image analyzer 156 with the face information in the personal profile 174, and in a case in which face information that matches the result of the analysis has been registered in the personal profile 174, specifies a user ID of the passenger who is seated in the seat in the interior of the vehicle. The seat in which the passenger is seated is associated with an image captured by the image analyzer 156, and the seat ID indicating which of the seats each passenger is seated in is applied to the user ID of the passenger specified by the passenger specificator 182.

Figure 6:
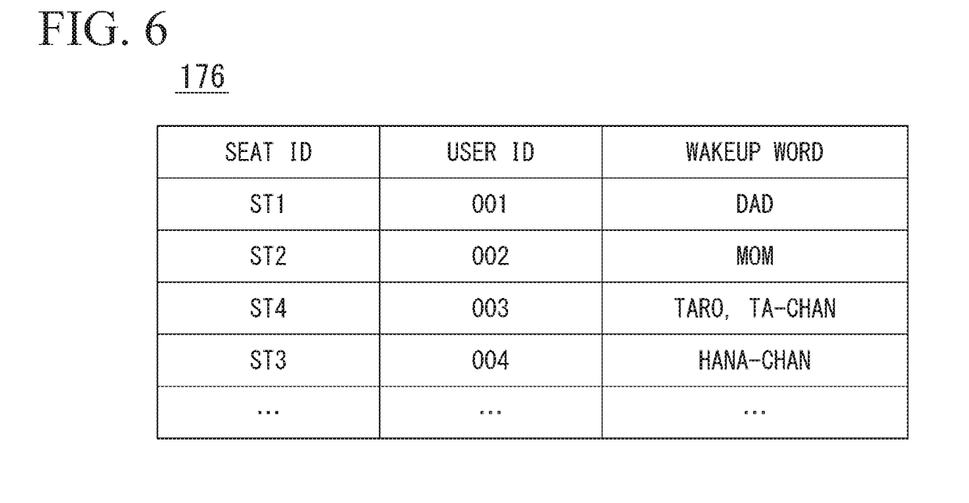
FIG. 6 is a diagram illustrating an example of content of seat information.

The setter 183 sets a seat position and a wakeup word for the passenger specified by the passenger specificator 182. For example, the setter 183 associates the user ID of the passenger specified by the passenger specificator 182 with the seat ID of the seat in which the passenger is seated and stores the user ID and the seat ID as a part of the seat information 176 in the storage 170. FIG. 6 is a diagram illustrating an example of content of the seat information 176. The seat information 176 is information in which the user ID and the wakeup word are associated with the seat ID. The wakeup word is an execution trigger of processing using agent functions and includes, for example, a name of each user. The wakeup word is not limited to information of each user stored in the seat information 176 and may be a word common to a plurality of users. For example, the wakeup word may include, for example, "Hey," "Talk to the back," "Listen," or the like. "Hey," may be set as a wakeup word for calling a user in the same row, and "Hey, you," may be set as a wakeup word for calling a user in a different row.

The setter 183 may associate the user ID and the seat ID and store the user ID and the seat ID as a part of the seat information 176 in the storage 170 on the basis of an input from the operator 120.

The setter 183 may update the seat position of the passenger specified by the passenger specificator 182 at each predetermined timing. In this manner, it is possible to change the seat information 176 in accordance with a current situation even if the user changes his/her seat when he/she is in the vehicle.

The passenger state estimator 184 estimates a state of the passenger on the basis of a result of analysis performed by the image analyzer 156 and a result of analysis performed by the sound analyzer 158. The passenger state includes an emption, a wakefulness state (whether the user is asleep or awake), and the like. In a case in which a voice tone is low or shouting voice is included, for example, the passenger state estimator 184 estimates that an angry emotion is included. In a case in which a closed-eye state has continued for a predetermined time or longer, the passenger state estimator 184 determines that the passenger is sleeping.

The speaking person specificator 185 specifies a speaking person on the basis of a result of analysis performed by the image analyzer 156 and a result of analysis performed by the sound analyzer 158. For example, the speaking person specificator 185 specifies an ID of a seat in which a passenger whose mouth is moving is seated and a seat in a direction from which sound is generated as a seat ID of the speaking person. The speaking person specificator 185 refers to the seat information 176, acquires the user ID associated with the seat ID of the speaking person, and specifies the user with the acquired user ID as the speaking person.

The speaking counterpart specificator 186 specifies a counterpart of speaking on the basis of spoken content recognized by the server device 200. In a case in which a wakeup word is included in the spoken content, for example, a passenger associated with the wakeup word in the seat information 176 is specified as the counterpart of the speaking. In a case in which a plurality of passengers are associated with the wakeup word, the speaking counterpart specificator 186 specifies the plurality of passengers as counterparts of the speaking.

In a case in which there is no language (for example, a wakeup word or another called name) indicating the counterpart of the speaking in the spoken content, the speaking counterpart specificator 186 may estimate the counterpart of the speaking from the spoken content and specify the counterpart of the speaking. In a case in which the spoken content is directed to children for example, the speaking counterpart specificator 186 specifies children included in passengers as counterparts of the speaking. In a case in which the speaking counterpart specificator 186 can acquire features of how the counterpart of the speaking speaks on the basis of a result of recognition performed by the server device 200 and a result of analysis performed by the sound analyzer 158, the speaking counterpart specificator 186 may specify the counterpart of the speaking on the basis of the features of how the counterpart speaks. For example, the speaking counterpart specificator 186 may specify that the speaking person is speaking to children as counterparts in a case of a high voice tone and may specify that the speaking person is speaking to adults as counterparts in a case of a low voice tone.

The seated position specificator 187 refers to the seat information 176 and specifies a position in which each passenger is seated (seat ID). For example, the seated position specificator 187 reads, from the seat information 176, the seat ID associated with the user ID of the user who is a speaking person specified by the speaking person specificator 185 and specifies the seat of the speaking person. In a case in which the counterpart of the speaking is specified by the speaking counterpart specificator 186, the seated position specificator 187 similarly specifies the seat of the counterpart of the speaking.

The determinator 188 determines whether or not to mediate delivery of a delivery message. For example, the determinator 188 determines whether or not a wakeup word has been spoken (hereinafter, referred to as a first condition). For example, the determinator 188 refers to the seat information 176, determines whether or not a wakeup word is included in spoken content on the basis of a result of recognition of the spoken content received from the server device 200, and in a case in which a wakeup word is included in the spoken content, determines that the first condition is satisfied. In a case in which the first condition is satisfied, the determinator 188 may determine to mediate delivery of the delivery message. Mediating of the delivery of the delivery message means delivery of sound generating the spoken content to another passenger. In a case in which the first condition is satisfied, the controller 180 may decide a passenger corresponding to the wakeup word as a counterpart of the speaking.

The determinator 188 determines whether or not the seat of the counterpart of the speaking is on the further rear side than the seat of the speaking person (hereinafter, referred to as a second condition) on the basis of the seat specified by the seated position specificator 187. In a case in which the second condition is satisfied, the determinator 188 may determine to mediate the delivery of the delivery message.

The determinator 188 determines whether the counterpart of the speaking will not respond to the speaking of the speaking person (hereinafter, referred to as a third condition). In a case in which the counterpart of the speaking does not speak within a predetermined time after the speaking of the speaking person, and in a case in which the content spoken by the counterpart of the speaking is not content for responding to the speaking of the speaking person, for example, the determinator 188 determines that the third condition is satisfied. In a case in which the third condition is satisfied, the determinator 188 may determine to mediate the delivery of the delivery message.

The determinator 188 determines whether or not the counterpart of the speaking is in a non-sleeping state (hereinafter, referred to as a fourth condition) on the basis of a result of estimation performed by the passenger state estimator 184. In a case in which the fourth condition is satisfied, the determinator 188 may determine to mediate the delivery of the delivery message.

The determinator 188 may determine to mediate the delivery of the delivery message in a case in which at least one of the first to fourth conditions is satisfied or may determine to mediate the delivery of the delivery message in a case in which all of them are satisfied.

The determinator 188 may decide a subject (delivering person) of the delivery of the delivery message. In a case in which an emotion level estimated by the passenger state estimator 184 is equal to or greater than a predetermined value, for example (a case in which the speaking person is very angry, for example), the determinator 188 decides an agent image instead of an avatar image as a delivering person.

The message generator 189 generates a delivery message on the basis of spoken content and the like understood by the natural language processor 240. In a case in which the speaking person specificator 185 has been able to specify the speaking person, the message generator 189 may acquire a called name indicating the speaking person from the personal profile 174 and generate a delivery message including the acquired called name of the speaking person. In a case in which an emotion of the speaking person has been estimated by the passenger state estimator 184, the message generator 189 may generate a delivery message in accordance with the emotion of the speaking person. In a case in which an emotion level estimated by the passenger state estimator 184 is equal to or greater than a predetermined value, for example (in a case in which the speaking person is very angry, for example), the message generator 189 generates a delivery message with a changed expression with a suppressed emotion. The message generator 189 outputs the generated delivery message to the presentation controller 160. In this manner, it becomes easy for the counterpart of the speaking to listen to the delivery message.

The controller 180 provides an instruction to the presentation controller 160 and performs the following processing. For example, the controller 180 controls the display 116 and the speaker 118 such that the display 116 and the speaker 118 output the delivery message toward the counterpart of the speaking. For example, the controller 180 decides a direction in which the delivery message is to be output (hereinafter, referred to as an output direction) on the basis of a positional relationship between the seat of the speaking person and the seat of the counterpart of the speaking. In a case in which the speaking person is seated in the driver's seat ST1 and the counterpart of the speaking is seated in the rear seat ST4, for example, the controller 180 decides a direction from the driver's seat ST1 toward the rear seat ST4 as the output direction.

The controller 180 may decide the output direction in accordance with the delivering person. In a case in which the speaking person is seated in the driver's seat ST1 but the delivering person is an agent image, for example, the controller 180 may decide a direction from a side of the rear seat ST4 opposite to the driver's seat ST1 (the left side of the vehicle) toward the rear seat ST4 as the output direction. In this manner, since the passenger seated in the rear seat ST4 hears sound from a direction in which there is no passenger, it is possible to intuitively recognize that a third person other than passengers is a speaking person.

The controller 180 decides a position at which it is desired to localize a simulated sound source (localization position) on the basis of the decided output direction and provides an instruction thereof to the sound generator 164. The localization position may be decided on a virtual line indicating the output direction in the interior of the vehicle or may be decided near the virtual line, for example. Alternatively, the localization position may be decided at a position that is closer to the counterpart of the speaking than to the speaking person on the virtual line.

For example, the controller 180 provides an instruction for outputting sound from a speaker that is closest to the localization position from among the plurality of speakers 118A to 118H. In a case in which the output direction is a direction from the driver's seat ST1 toward the rear seat ST4, for example, the controller 180 decides a position that is closer to the rear seat ST4 than to the driver's seat ST1 as the localization position. Then, the controller 180 provides an instruction for causing the speaker 118F that is closest to the localization position to output sound. In this manner, the passenger seated in the rear seat ST4 hears the sound from the direction of the driver's seat ST1 and can thus intuitively recognize that the passenger seated in the driver's seat ST1 is the speaking person.

In a case in which the plurality of speakers 118A to 118H are provided with directivity, the controller 180 may provide an instruction for causing a speaker provided with directivity that conforms to the decided output direction to output sound. In this manner, advantages similar to those described above can be achieved.

The controller 180 may decide a position at which an image is to be displayed (display position) and may provide an instruction to the image generator 162 on the basis of information indicating the positional relationship between the speaking person and the counterpart of the speaking (the decided output direction, for example). For example, the controller 180 decides a direction of the speaking person when viewed from the counterpart of the speaking as a display position of an agent image. The display position may indicate a part of the plurality of displays 116 (including a display and the like for the rear seats) mounted in the interior of the vehicle or may also include positions in screens of the displays 116. As described above, the display 116 may be provided with a display for each seat, such as displays for the rear seats. In this manner, the controller 180 can display an agent image on the display for each seat.

The controller 180 may decide content to be presented to the passenger on the basis of the spoken content. In a case in which an agent is used as a speaking person and is caused to output a delivery message, for example, the controller 180 controls the sound generator 164 such that the sound generator 164 generates agent sound to deliver the delivery message and to output the delivery message to the speaker 118 and causes the display 116 to display the agent image. The agent sound is sound that imitates speaking generated by someone who is different from the speaking person.

In a case in which the delivery message includes content itself spoken by the speaking person, the controller 180 may cause the display 116 to display an avatar image of the speaking person instead of the agent image. In a case in which the delivery message includes content itself spoken by the speaking person, the controller 180 may decide to generate agent sound that includes a part of sound stored in the collected sound data 178 and to cause the display 116 to display an image of an avatar of the speaking person (hereinafter, referred to as an avatar image). In a case in which the delivery message is "OO said ' . . . '", for example, the part corresponding to ' . . . ' is output as sound of OO stored in the collected sound data 178, and the other part is output as agent sound. The agent sound is sound that imitates speaking of a third person (agent) who is different from the speaking person.

[Server Device]

The server device 200 includes, for example, a communicator 210, a sound section detector 220, a sound recognizer 230, a natural language processor 240, and a storage 280. These components are realized by a computer processor such as a CPU executing programs (software). A part or entirety of these components may be realized by hardware (circuit unit; including circuitry) such as an LSI, an ASIC, an FPGA, or a GPU or may be realized by cooperation of software and hardware. The programs may be stored in advance in the storage 280, or the programs may be stored in a detachable storage medium such as a DVD or a CD-ROM and may be installed in the storage 280 by the storage medium being attached to the drive device.

The communicator 210 communicates with the agent device 100 via the network NW using a cellular network, a Wi-Fi network, Bluetooth, or a DSRC, for example. The communicator 210 receives a sound stream transmitted from the agent device 100.

The sound section detector 220 detects sound sections from the sound stream transmitted from the agent device 100. For example, the sound section detector 220 detects sound sections on a basis of amplitudes and zero crossing of a sound waveform in the sound stream, for example. The sound section detector 220 may perform section detection based on identification between sound and non-sound in units of frames based on a Gaussian mixture model (GMM) or may perform section detection through matching processing with a database for detecting sound sections stored in advance in the storage 260 or the like.

The sound recognizer 230 recognizes sound for each sound section detected by the sound section detector 220 and converts the sound into texts as letter information.

The natural language processor 240 understands structures of the letter information converted into texts by the sound recognizer 230 and a meaning of the spoken content. The natural language processing includes morphological analysis, syntactic analysis, semantic analysis, context analysis, and the like. In the morphological analysis, the letter information is divided into units of minimum expression elements with meanings, and word classes and the like of the divided units (morphemes) are analyzed, for example. In the syntactic analysis, sentence structures are analyzed on the basis of the morphemes obtained in the morphological analysis, for example. In the semantic analyzers of components with meanings are distinguished on the basis of syntaxes obtained in the syntactic analysis, for example. In the context analysis, meanings are interpreted in units of sentences or contexts, for example. The natural language processor 240 may interpret meanings of the letter information using artificial intelligence processing such as machine learning processing using probabilities, for example. The natural language processor 240 causes the communicator 210 to transmit text data of spoken content and information indicating the understood meanings of the spoken content to the agent device 100.

The storage 280 is realized by, for example, an HDD, a flash memory, an EEPROM, a ROM, a RAM, or the like. The storage 280 stores, for example, the personal profile 284, other information, and the like. The personal profile 284 is information obtained by associating voice feature information, a gender, an age, a favorite category, a past utilization history of the server device 200, and the like with individual identification information, for example.

[Processing Flow]

Hereinafter, a flow of a series of processes performed by the communication support system 1 will be described using a flowchart.

First, processing No. 1 will be described. The processing No. 1 is a method of delivering collected spoken content itself.

Figure 7:
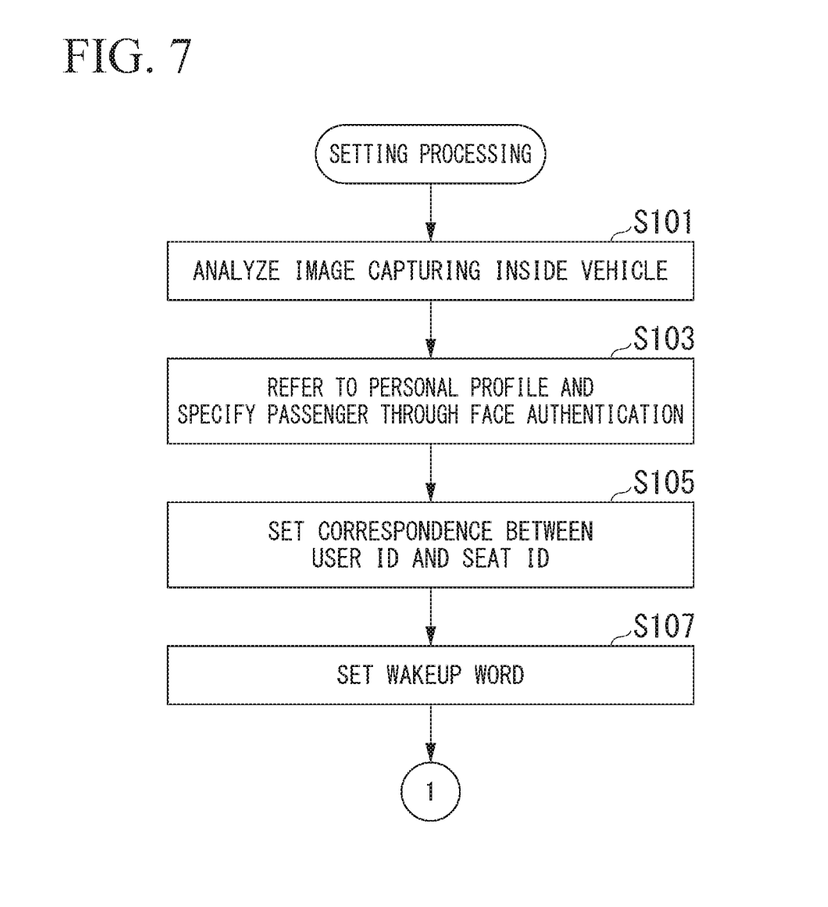
FIG. 7 is a flowchart illustrating an example of a flow of setting processing performed by the communication support system.

FIG. 7 is a flowchart illustrating an example of a flow of setting processing performed by the communication support system 1. First, the image analyzer 156 performs analysis processing on an image captured by the in-vehicle camera 112 and extracts feature information such as a person shape and a face shape (Step S101). The passenger specificator 182 matches the feature information extracted by the image analyzer 156 with face information in the personal profile 174, and in a case in which face information that matches the extracted feature information has been registered in the personal profile 174, the passenger specificator 182 specifies a user ID of a passenger seated in a seat in the interior of the vehicle (Step S103).

The setter 183 sets a correspondence between the user ID of the passenger specified by the passenger specificator 182 and the seat ID of the seat in which the passenger is seated by associating the user ID with the seat ID and stores the user ID and the seat ID as a part of the seat information 176 in the storage 170 (Step S105). Then, the setter 183 sets a wakeup word by associating the user ID with the wakeup word and stores the user ID and the wakeup word as a part of the seat information 176 in the storage 170 (Step S107). For example, a called name is set as a wakeup word for the user ID for which the called name has been set in the personal profile 174.

Figure 8:
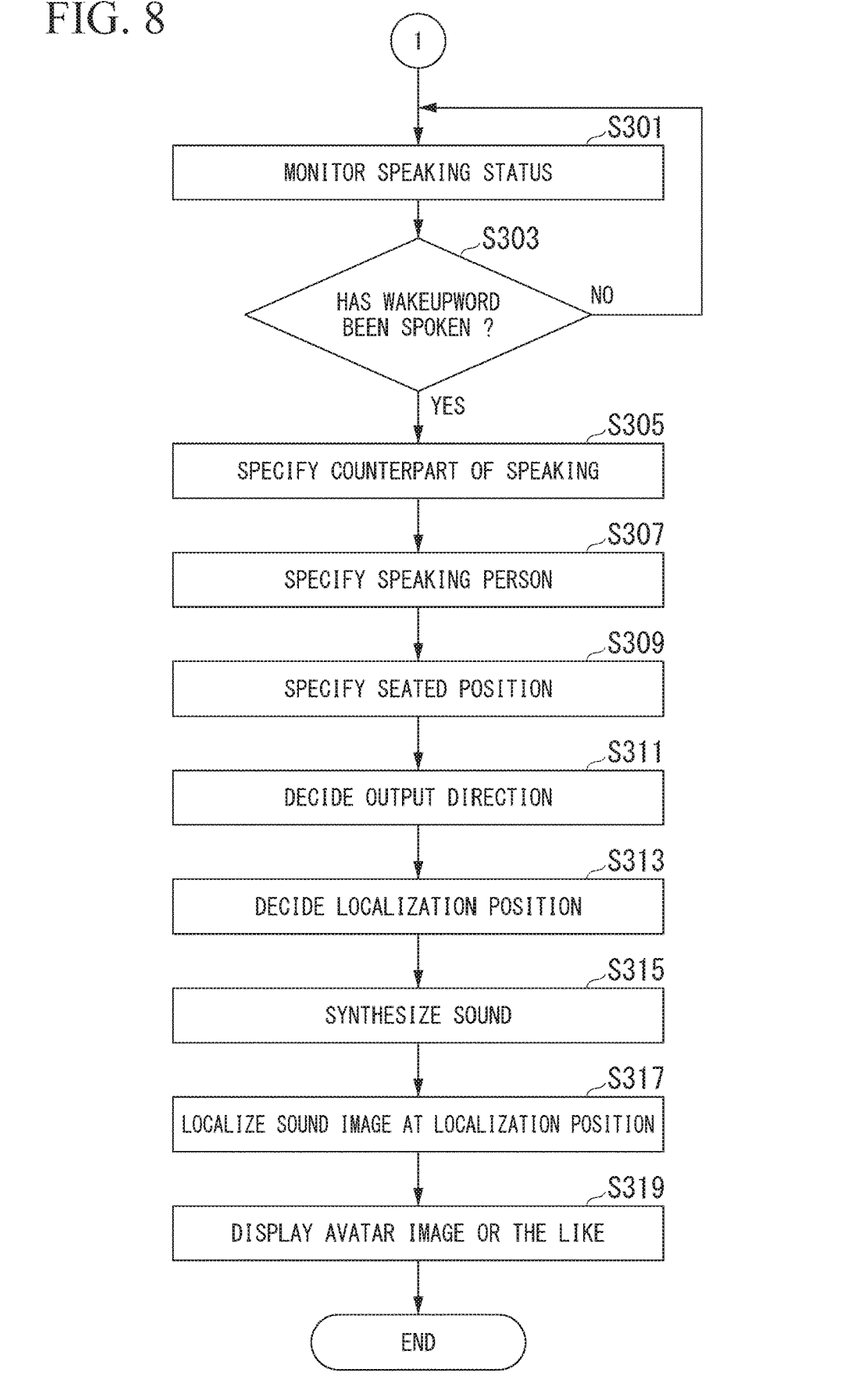
FIG. 8 is a flowchart illustrating an example of a flow of intermediation processing (No. 1) performed by the communication support system.

FIG. 8 is a flowchart illustrating an example of a flow of intermediation processing (No. 1) performed by the communication support system 1. First, the agent device 100 monitors a speaking status (Step S301). For example, the sound input 152 receives an input of sound from the microphone 114 and transmits the sound to the server device 200. The sound section detector 220 detects sound sections from the received sound. The sound recognizer 230 recognizes sound for each sound section, converts the sound into texts as letter information, and generates text data of spoken content. The natural language processor 240 understands the spoken content on the basis of the generated text data and transmits a result of the recognition to the agent device 100 using the communicator 210.

The determinator 188 determines whether or not the wakeup word has been spoken on the basis of the text data of the spoken content (Step S303). That is, the determinator 188 determines whether or not the first condition is satisfied. In a case in which the wakeup word has been spoken (that is, in a case in which the first condition is satisfied), the speaking counterpart specificator 186 decides a passenger to which the wakeup word has been assigned as a counterpart of the speaking (Step S305). Then, the speaking person specificator 185 specifies a speaking person on the basis of a result of analysis performed by the image analyzer 156 and a result of analysis performed by the sound analyzer 158 (Step S307). The seated position specificator 187 refers to the seat information 176 and specifies a seat ID of the speaking person and a seat ID of the counterpart of the speaking (Step S309).

Then, the controller 180 decides an output direction in which a delivery message is to be output on the basis of the seat ID of the speaking person and the seat ID of the counterpart of the speaking (Step S311). The controller 180 decides a localization position at which it is desired to localize a simulated sound source on the basis of the output direction (Step S313). Then, the controller 180 generates sound on the basis of the spoken content recognized in Step S301 (Step S315). The sound generator 164 generates sound that is generated in Step 315 and is for localizing a simulated sound source at the localization position decided in Step S313 (Step S317). The image generator 162 generates an avatar image (or an agent image) on the basis of the spoken content recognized in Step S301, and the presentation controller 160 causes the display 116 to display the generated image (Step S319).

Figure 9:
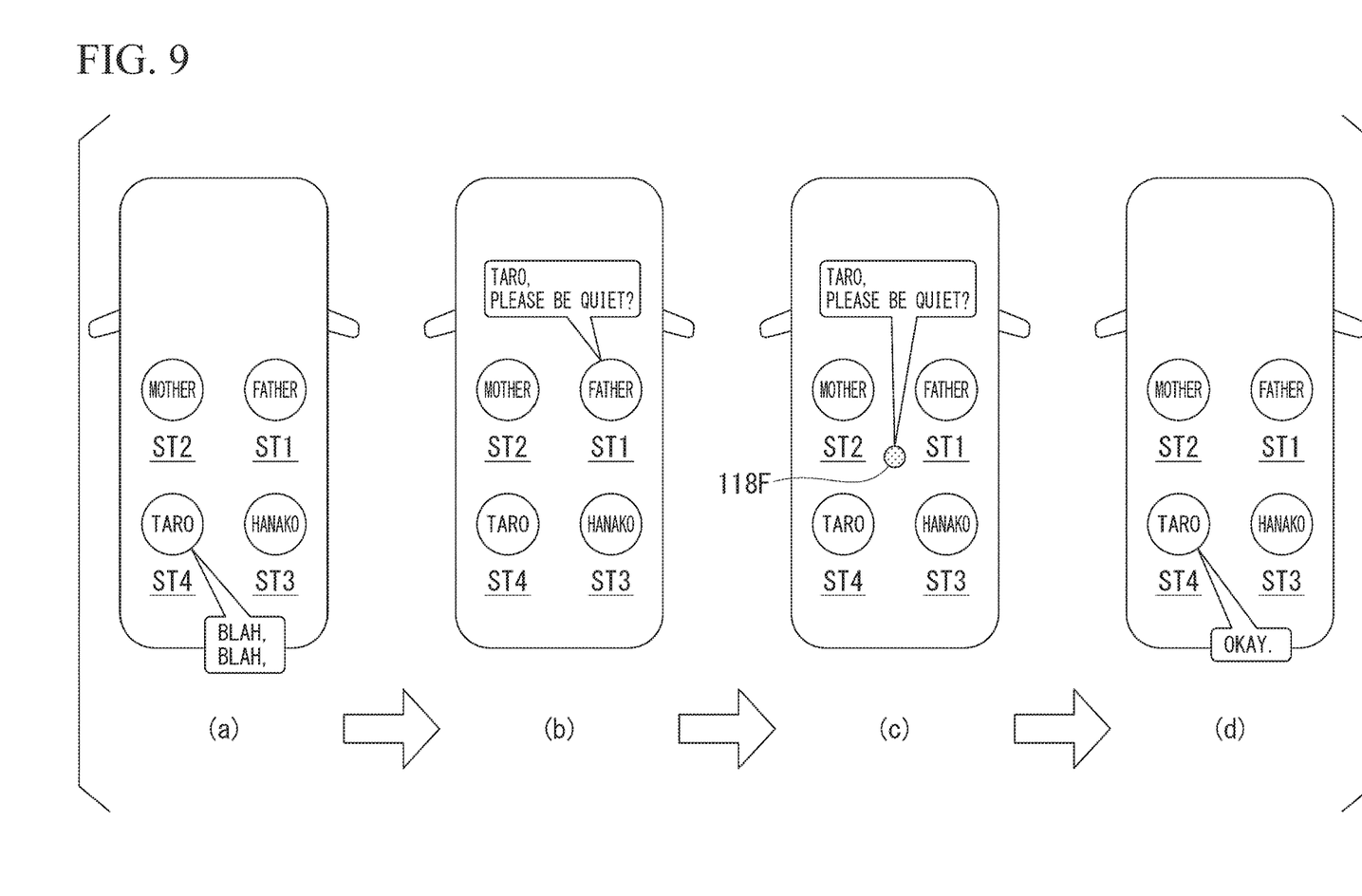
FIG. 9 is a reference diagram for explaining an example in which the processing No. 1 is executed.

FIG. 9 is a reference diagram for explaining an example in which the processing No. 1 is executed. For example, it is assumed that Taro seated in the rear seat ST4 is making noise as illustrated in FIG. 9(a). Then, it is assumed that his father seated in the driver's seat ST1 says "Taro, please be quiet" as illustrated in FIG. 9(b). In a case in which "Taro" is set as a wakeup word, the agent device 100 causes the speaker 118F mounted near the center of the ceiling in the interior of the vehicle to output sound generated as "Taro, please be quiet" as illustrated in FIG. 9(c). In this manner, Taro can hear content spoken by his father through the sound from the speaker 118F even in a case in which it is difficult to hear the speaking of his father. Then, Taro can answer "Okay" as illustrated in FIG. 9(d).

In this manner, it is possible to cause an agent function to be activated and to effectively deliver the spoken content to the counterpart of the speaking by the speaking person including the wakeup word in the speaking.

Next, processing No. 2 will be described. The processing No. 2 is a method of generating a delivery message on the basis of collected spoken content and a state of a speaking person and delivering the delivery message to the speaking person. Description of processing that is the same as that in the processing No. 1 will be omitted. Hereinafter, processing that is different from that in the processing No. 1 will be mainly described.

Figure 10:
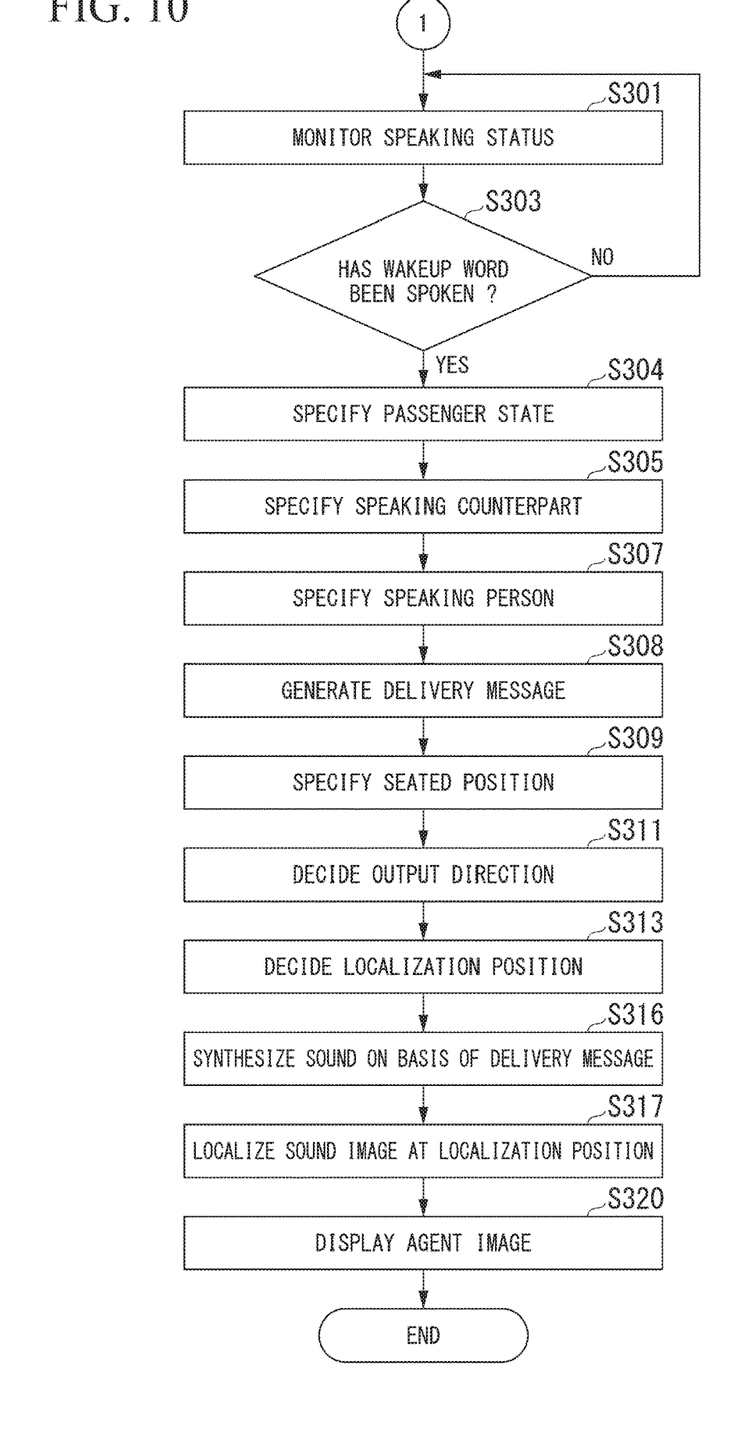
FIG. 10 is a flowchart illustrating an example of a flow of intermediation processing (No. 2) performed by the communication support system.

FIG. 10 is a flowchart illustrating an example of a flow of intermediation processing (No. 2) performed by the communication support system 1. In a case in which it is determined that the wakeup word has been spoken in Step S303, the passenger state estimator 184 estimates a state of the passenger on the basis of a result of analysis performed by the image analyzer 156 and a result of analysis performed by the sound analyzer 158 (Step S304). Then, the message generator 189 generates a delivery message on the basis of the state of the passenger estimated in Step S304, information received from the server device 200, and the like (Step S308). The controller 180 generates sound on the basis of the delivery message generated in Step S308 (Step S316). The image generator 162 generates an agent image on the basis of the delivery message generated in Step S308, and the presentation controller 160 causes the display 116 to display the generated image (Step S320).

Figure 11:
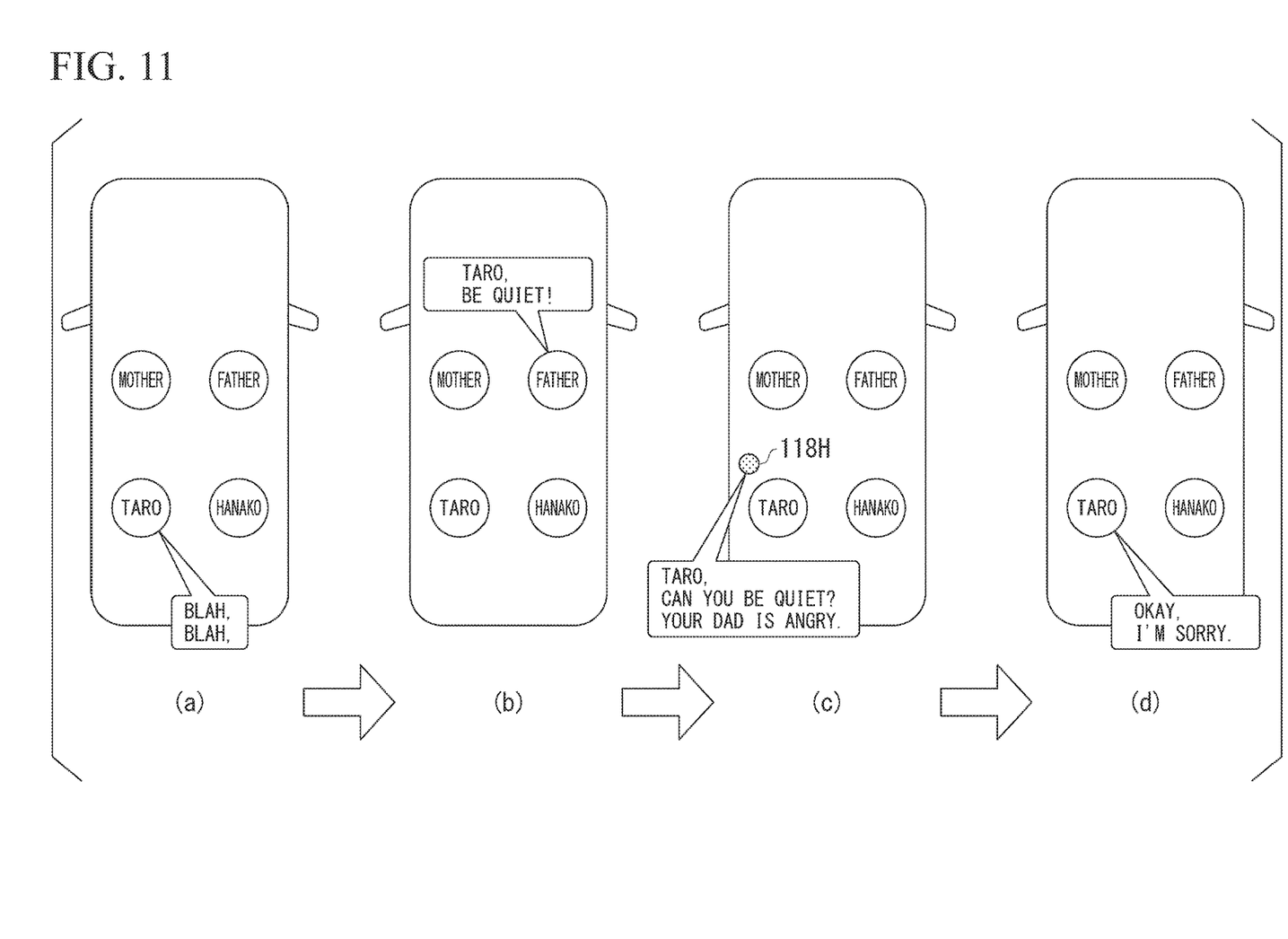
FIG. 11 is a reference diagram for explaining an example in which the processing No. 2 is executed.

FIG. 11 is a reference diagram for explaining an example in which the processing No. 2 is executed. For example, it is assumed that Taro seated in the rear seat ST4 is making noise as illustrated in FIG. 11(a). Then, it is assumed that his father seated in the driver's seat ST1 gets angry and says "Taro, please be quiet" as illustrated in FIG. 11(b). In a case in which "Taro" is set as a wakeup word, the agent device 100 causes the speaker 118H mounted near the rear seat ST4 in the interior of the vehicle to output sound generated as "Taro, can you be quiet? Your dad is angry." as illustrated in FIG. 11(c). In this manner, Taro can hear content spoken by his father through the sound from the speaker 118H even in a case in which it is difficult to hear the speaking of his father. Although Taro is in a positional relationship in which he cannot see his father's facial expression, he can know that his father is angry. Then, Taro can answer "Okay, I'm sorry" as illustrated in FIG. 11(d).

In this manner, it is possible to effectively deliver the spoken content by delivering the status of the speaking person to the counterpart of the speaking.

The determinator 188 may determine whether or not the second to fourth conditions are satisfied at a predetermined timing (before the processing of deciding the output direction in Step S311, for example). In a case in which the second to fourth conditions are satisfied, the further processing of Step S311 may be executed.

According to the aforementioned embodiment, it is possible to effectively support communication in an interior of a vehicle by providing a microphone that is mounted in the interior of the vehicle, a sound output that is mounted in the interior of the vehicle, a recognizer that recognizes spoken content included in sound data collected by the microphone, and a controller that generates a delivery message to be delivered from a passenger who has output the collected sound to another passenger on the basis of a result of recognition performed by the recognizer, generates sound on the basis of the generated delivery message, and causes the sound output to output the generated sound toward the other passenger.

For example, it is possible to attract attention of the counterpart of the speaking and to effectively deliver the delivery message by delivering the spoken content to the counterpart of the speaking using generated sound and an agent image (or an avatar image) with the agent function. Therefore, it is possible for the passenger seated in the driver's seat to perform communication without talking to the rear seat with loud voice. It is not necessary for the passenger seated in the driver's seat to talk to the rear seat many times, and the passenger can concentrate on driving.

It is possible to restrict content to be delivered by activating the agent function in a case in which a wakeup word is included. Therefore, it is possible to prevent conversation between the passenger seated in the driver's seat and the passenger seated in the front passenger seat from being delivered to the rear seats.

It is possible to maintain a comfortable environment in the interior of the vehicle and to deliver spoken content with the agent function only when needed by not delivering spoken content in a case in which the counterpart of the speaking responds to the spoken content and in a case in which the counterpart of the speaking is sleeping.

Although the configuration for performing the invention has been described above using the embodiment, the invention is never limited thereto, and various modifications and replacement can be added without departing from the gist of the invention.

Although the delivery message is delivered in the case in which the first condition is satisfied, for example, in the above description, the invention is not limited thereto. For example, the delivery message may be delivered toward the counterpart of the speaking in a case in which the second condition is satisfied even if the wakeup word is not included. In this manner, it is possible to deliver speaking of the passenger seated in the driver's seat or the front passenger seat to the rear seats although conversation between the passenger seated in the driver's seat and the passenger seated in the front passenger seat is not delivered to the rear seats.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication support system comprising:
a microphone that is mounted in an interior of a vehicle;
a sound output device that is mounted in the interior of the vehicle;
a recognizer configured to recognize spoken content included in sound data collected by the microphone; and
a controller configured to generate a delivery message to be delivered from a passenger who has output the collected sound to another passenger based on a result of the recognition performed by the recognizer, generates sound based on the generated delivery message, and causes the sound output device to output the generated sound to the other passenger,
wherein the controller is configured to determine whether or not the other passenger has responded to the speaking of the passenger who has output the collected sound based on the result of the recognition performed by the recognizer, and in a case in which the other passenger has not responded to the speaking of the passenger who has output the collected sound, the controller is configured to cause the sound generated based on the collected sound to be output toward the other passenger.

2. The communication support system according to claim 1, wherein the controller is configured to generate sound that imitates speaking of a person who is different from the passenger who has output the collected sound.

3. The communication support system according to claim 1, wherein the controller is configured to decide a predetermined position in the interior of the vehicle based on a relationship between a seat position of the passenger and a seat position of the other passenger and causes the sound output device to localize a simulated sound source of the generated sound at the predetermined position.

4. The communication support system according to claim 1,
wherein the sound output device includes a plurality of sound output devices that are mounted at different positions in the interior of the vehicle, and
the controller is configured to provide an instruction for outputting sound to a sound output device located close to the other passenger among the plurality of sound output devices.

5. The communication support system according to claim 1, wherein the controller is configured to provide to the sound output device provided with directivity an instruction for outputting sound in a direction from the passenger toward the other passenger.

6. The communication support system according to claim 1,
wherein the controller is configured to refer to wakeup words associated in advance with each of the passengers based on the result of the recognition performed by the recognizer, and in a case in which a wakeup word of the wakeup words is included in the spoken content, the controller is configured to cause sound generated based on the collected sound to be output toward the passenger associated with the wakeup word.

7. The communication support system according to claim 1, further comprising:
a camera configured to image the interior of the vehicle; and
an image analyzer configured to analyze an image captured by the camera,
wherein the controller configured to determine whether or not the other passenger is sleeping based on a result of the image analysis performed by the image analyzer, and in a case in which the other passenger is not sleeping, the controller causes the sound generated based on the collected sound to be output toward the other passenger.

8. The communication support system according to claim 1, wherein the controller is configured to estimate an emotion of the speaking person and generates the delivery message in accordance with the estimated emotion based on the result of the recognition performed by the recognizer.

9. The communication support system according to claim 8, wherein the controller is configured to generate the delivery message changed to an expression with a suppressed emotion as compared with the spoken content in a case in which a level of the estimated emotion is equal to greater than a predetermined value.

10. A communication support system comprising:
a microphone that is mounted in an interior of a vehicle;
a sound output device that is mounted in the interior of the vehicle;
a recognizer configured to recognize spoken content included in sound data collected by the microphone;
a controller configured to generate a delivery message to be delivered from a passenger who has output the collected sound to another passenger based on a result of the recognition performed by the recognizer, generates sound based on the generated delivery message, and causes the sound output device to output the generated sound to the other passenger;
a camera configured to image the interior of the vehicle; and
an image analyzer configured to analyze an image captured by the camera,
wherein the controller configured to determine whether or not the other passenger is sleeping based on a result of the image analysis performed by the image analyzer, and in a case in which the other passenger is not sleeping, the controller causes the sound generated based on the collected sound to be output toward the other passenger.

11. A communication support system according to claim 10, wherein the controller is configured to estimate an emotion of the speaking person and generates the delivery message in accordance with the estimated emotion based on the result of the recognition performed by the recognizer.

12. A communication support system comprising:
a microphone that is mounted in an interior of a vehicle;
a sound output device that is mounted in the interior of the vehicle;
a recognizer configured to recognize spoken content included in sound data collected by the microphone; and
a controller configured to generate a delivery message to be delivered from a passenger who has output the collected sound to another passenger based on a result of the recognition performed by the recognizer, generates sound based on the generated delivery message, and causes the sound output device to output the generated sound to the other passenger,
wherein the controller is configured to estimate an emotion of the speaking person and generates the delivery message in accordance with the estimated emotion based on the result of the recognition performed by the recognizer.

* * * * *